United States Patent [19]

Spitzer et al.

[11] Patent Number: 5,340,900
[45] Date of Patent: Aug. 23, 1994

[54] HARDENER COMPOSITION FOR THE PRODUCTION OF POLYURETHANE SHAPED ARTICLES

[75] Inventors: Martin Spitzer, Ehrenkirchen, Fed. Rep. of Germany; Hans Freistädter, Rheinfelden, Switzerland

[73] Assignee: Ciba-Geigy Corporation, Ardsley, N.Y.

[21] Appl. No.: 96,136

[22] Filed: Jul. 22, 1993

[30] Foreign Application Priority Data

Jul. 30, 1992 [CH] Switzerland .................. 2403/92

[51] Int. Cl.$^5$ ............................................. C08L 75/00
[52] U.S. Cl. .............................. 528/53; 528/67; 528/77; 252/182.25; 252/182.24
[58] Field of Search .................. 528/53, 67, 77; 252/182.25, 182.24

[56] References Cited

U.S. PATENT DOCUMENTS

| | | | |
|---|---|---|---|
| 3,267,050 | 8/1968 | Kuryla et al. | 260/2.5 |
| 3,979,364 | 9/1976 | Rowton | 260/775 |
| 3,993,576 | 11/1976 | Barron | 252/182 |
| 4,826,885 | 5/1989 | Tsai | 521/176 |
| 5,028,684 | 7/1991 | Neuhaus et al. | |
| 5,237,036 | 8/1993 | Spitzer | 528/67 |

FOREIGN PATENT DOCUMENTS

| | | |
|---|---|---|
| 0265781 | 5/1988 | European Pat. Off. |
| 0512947 | 11/1992 | European Pat. Off. |
| 9015835 | 12/1990 | PCT Int'l Appl. |
| 9112286 | 8/1991 | PCT Int'l Appl. |

OTHER PUBLICATIONS

Ullmanns Encyclopädie der technischenChemie (1980) (Ullmanns Encyclopedia of Industrial Chemistry) 4th Ed., vol. 19, pp. 31–38; pp. 304, 305.
Ullmanns Encyclopdädie der technischen Chemie, 4th Ed., vol. 19 (1980) pp. 297–299.
Kunststoffhandbuch (Plastics Handbook), vol, 7, 2nd Ed. (1983) pp. 76 & 77.
Kunststoffhandbuch, vol. 7, 2nd Ed. (1983).
Ullmanns Encyclopädie der technischen Chemie, 4th Ed., vol. 19, (1980) p. 316.

*Primary Examiner*—Maurice J. Welsh
*Attorney, Agent, or Firm*—William A. Teoli, Jr.

[57] ABSTRACT

The invention relates to compositions comprising a) a polyol having on average 3 to 8 hydroxyl groups per molecule and an average molecular weight per hydroxyl group of up to 150; b) a polyether-polyol having on average 2 to 3 hydroxyl groups per molecule and an average molecular weight per hydroxyl group of 150 to 500 and c) a poly(oxyalkylene)polyamine having on average 2 to 4 amino groups per molecule and an average total molecular weight of between 1000 and 3000.

The compositions described are distinguished by a low tendency to demix, even during prolonged storage.

Reaction mixtures of the compositions described, as hardeners, and polyisocyanates of the diphenylmethane series cure fully without passing through a brittle phase. The shaped articles formed have good mechanical properties.

15 Claims, No Drawings

HARDENER COMPOSITION FOR THE PRODUCTION OF POLYURETHANE SHAPED ARTICLES

The invention relates to novel hardener compositions for polyisocyanates of the diphenylmethane series, reaction mixtures based on these polyisocyanates and hardener compositions, a process for the production of polyurethane shaped articles using the reaction mixtures described, and the polyurethane shaped articles obtainable from the reaction mixtures.

For production of polyurethane shaped articles in practice, polyisocyanates of the diphenylmethane series are chiefly used as the isocyanate component. In order to be able to control the properties of the polyurethane material, in general compositions of two or more different reaction components are employed as hardeners, and these components can differ to a greater or lesser degree in nature, functionality and molecular weight. Thus, for example, the mechanical or thermal properties of polyurethane shaped articles, and also the length of the processing time of the reaction mixture of polyisocyanate and hardener or the course of full curing or the viscosity of this mixture can be adjusted, depending on the constituents of the hardener composition. Compositions which comprise at least one low molecular weight and one long-chain reaction component for the isocyanate, in particular corresponding polyols and/or polyamines, are often employed, for example, as hardeners. The low molecular weight reaction component increases inter alia the hardness of the resulting polyurethane material, and the long-chain component increases its toughness. It is therefore not surprising that many different hardener compositions have already been described for the preparation of polyurethane materials.

The preparation of polyurethane materials based on polyisocyanates of the diphenylmethane series with the aid of mixtures of low molecular weight polyols and long-chain polyamines is known, for example, from EP-A-0 265 781 (=U.S. Pat. No. 5,028,684) or U.S. Pat. No. 3,267,050. Thus, for example, the U.S. patent specification mentioned last proposes the use of a mixture of polyols and at least one poly(oxyalkylene)polyamine for curing polyisocyanates, including those of the diphenylmethane series, in order to prepare polyurethane materials having a particularly good mechanical strength, and, for example, describes the preparation of a polyurethane elastomer by a joint reaction of diisocyanatodiphenylmethane with 1,4-butanediol as well as a polypropylene glycol having a molecular weight of about 2000 and a poly(oxypropylene)diamine of about the same molecular weight.

The aim of the present invention is in particular to further simplify the practical use of compositions based on low molecular weight polyols and long-chain polyamines as polyisocyanate hardeners.

In this context, hardener compositions of the type mentioned which can be stored for a very long time without the danger of their individual constituents demixing during storage are to be provided. This problem often occurs in compositions such as those defined above, and is also dealt with, for example, in the U.S. Pat. No. 3,993,576 and U.S. Pat. No. 4,826,885.

The requirements of mould construction are furthermore to be reduced, so that, inter alia, the production of large models and small piece numbers becomes less expensive with the aid of polyurethane compositions.

The heating of the moulds which is now customary requires great expenditure during mould construction, especially in the construction of large moulds, because, for example, very uniform heating must be ensured here in order to avoid the development of stresses in the polyurethane article. Another considerable disadvantage of this procedure is that considerable dimensional inaccuracies may occur on the shaped article because of the heating of the moulds.

The reason for working with hot moulds lies in the widespread occurrence of a brittle phase during the first phase of full curing of polyurethane materials. This is a time phase in which, although the shaped article freshly formed from the liquid reaction mixture is already in the solid state, the composition is temporarily very brittle. The brittle phase here is as a rule considerably longer than the period required to convert the reaction mixture into the solid phase. A brittle phase is of disadvantage in particular because removal from the mould can easily lead to damage or even destruction of the shaped article during this period of time, since the shaped articles often have to be subjected to relatively severe mechanical stress during this procedure. Even after removal from the mould, such shaped articles must still be handled relatively carefully until the end of the brittle phase.

However, relatively long brittle phases, for example starting a few minutes after the polyisocyanate and hardener have been brought together and sometimes lasting for up to several hours, depending on the reactivity of the reaction mixture, occur in many polyurethane reaction mixtures if full curing of the mixture is carried out at room temperature or only moderately elevated temperature, the duration of this brittle phase in general being longer, the longer the pot life of the reaction mixture used. Attempts are therefore generally made to avoid damage due to a brittle phase by carrying out curing of the reaction mixture with the aid of heated moulds, as is also described in the abovementioned documents of the prior art. By this procedure, the critical range of the reaction conversion during which the brittle phase occurs is passed through particularly quickly, and a brittle phase is no longer of importance in practice.

The second essential component of the object of the present invention is therefore to further develop hardener mixtures for polyisocyanates of the diphenylmethane series which are based on polyether-polyamines and polyols such that they allow full curing of the polyisocyanates even at room temperature and with the aid of non-heated moulds, without a measurable brittle phase occurring.

To achieve this object, the invention proposes, as the hardener, a composition which comprises a) a polyol having on average 3 to 8 hydroxyl groups per molecule and an average molecular weight per hydroxyl group of up to 150; b) a polyether-polyol having on average 2 to 3 hydroxyl groups per molecule and an average molecular weight per hydroxyl group of 150 to 500 and c) a poly(oxyalkylene)polyamine having on average 2 to 4 amino groups per molecule and an average total molecular weight of between 1000 and 3000.

The compositions according to the invention allow curing of polyisocyanates of the diphenylmethane series at room temperature or slightly elevated temperature without a brittle phase being passed through, i.e. the material, once it has become solid, remains elastic throughout the entire full curing time. Polyurethane material which has been prepared with a hardener composition according to the invention furthermore shows a good mechanical strength and in particular good cracking resistance values. Compared with identical compositions which comprise, however, long-chain polyols instead of the poly(oxyalkylene)polyamine, the heat deformation resistance furthermore is often improved considerably. This is a not insignificant advantage, because subsequent machining of the polyurethane shaped articles according to the invention, for example with the aid of drills, milling machines or saws, as is often necessary, is thereby facilitated considerably. The compositions according to the invention moreover can be employed without problems even after very prolonged storage, since no demixing of their liquid components occurs, even if they are stored at temperatures in the region of room temperature.

Constituents a) of the hardener compositions according to the invention are, for example, trimethylolpropane, glycerol, erythritol or pentaerythritol; pentitols, such as arabitol, adonitol or xylitol; hexitols, such as sorbitol, mannitol or dulcitol, the widely varying types of sugar, for example sucrose, or sugar derivatives and starch derivatives. Substances which are particularly suitable are low molecular weight reaction products of polyhydroxy compounds, such as those defined, with ethylene oxide and/or propylene oxide, and also the low molecular weight reaction products of other compounds containing a sufficient number of groups capable of reaction with ethylene oxide and/or propylene oxide, for example the corresponding reaction products of amines, such as, in particular, ammonia, ethylenediamine, 1,4-diaminobenzene, 2,4-diaminotoluene, 2,4'-diaminodiphenylmethane, 4,4'-diaminodiphenylmethane, 1-methyl-3,5-diethyl-2,4-diaminobenzene and/or 1-methyl-3,5-diethyl-2,6-diaminobenzene. Other suitable polyamines are listed in EP-A-0 265 781. Mixtures of suitable polyols can also be employed as component a) of the compositions according to the invention.

The lower limit for the average molecular weight per hydroxyl group in the polyols proposed as constituent a) is preferably 60. Particularly good results are achieved if the average molecular weight per hydroxyl group is above 70.

Especially preferred as constituent a) of the hardener compositions according to the invention are reaction products of propylene oxide with amines, in particular with ethylenediamine, and with polyhydroxy compounds, in particular sugars. Such products are also commercially obtainable, sometimes as a mixture with other polyols corresponding to the definition of component a), for example under the names Quadrol L ® and Lupranol 3321 ®.

The hardener compositions according to the invention can comprise, for example, 20 to 80% by weight, in particular 30 to 65% by weight, of constituent a). Certain polyether-polyols are employed as constituent b) of the polyol component according to the invention. These polyether-polyols can be obtained, for example, by reaction of a starter with alkylene oxides, for example with ethylene oxide, propylene oxide or butylene oxide, or tetrahydrofuran. Starters here are all those usually suitable for the preparation of polyether-polyols having a functionality of 2 or 3, for example water, aliphatic, cycloaliphatic or aromatic polyhydroxy compounds having 2 or 3 hydroxyl groups, such as ethylene glycol, propylene glycol, butanediols, hexanediols, octanediols, dihydroxybenzenes or bisphenols, for example bisphenol A, trimethylolpropane or glycerol, or amines (see Ullmanns Encyclopädie der technischen Chemie (Ullmann's Encyclopedia of Industrial Chemistry), 4th Edition, Volume 19, Verlag Chemie GmbH, Weinheim 1980, pages 31–38 and pages 304, 305).

Constituent b) is in general present in an amount of 5 to 30, in particular 10 to 20% by weight, based on the total hardener composition, and can of course be a mixture of corresponding polyether-polyols.

Substances which are particularly suitable as constituent b) of the compositions according to the invention are polyether-polyols based on ethylene oxide and polyether-polyols based on propylene oxide, and also corresponding ethylene oxide/propylene oxide copolymers, which can be either random or block copolymers. The ratio of ethylene oxide to propylene oxide in these copolymers can vary within wide limits. Thus, for example, it is possible for only the terminal hydroxyl groups of the polyether-polyols to be reacted with ethylene oxide (end masking). However, the content of ethylene oxide units in the polyether-polyols suitable for constituent b) can also assume, for example, values of up to 75 or 80% by weight. It is usually appropriate for the polyether-polyols to be at least masked on the ends with ethylene oxide. They then have, in fact, terminal primary hydroxyl groups, which are more reactive than the secondary hydroxyl groups originating from the reaction with propylene oxide.

Polytetrahydrofurans which, like the polyalkylene glycols already defined above, are likewise commercially obtainable (commercial name, for example, POLYMEG ®) are also to be noted. The preparation and properties of such polytetrahydrofurans are described in more detail, for example, in Ullmanns Encyclopädie der technischen Chemie (Ullmann's Encyclopedia of Industrial Chemistry), 4th Edition, Volume 19, Verlag Chemie GmbH, Weinheim 1980, pages 297–299.

The use of polytetrahydrofuran is in general preferred for mechanical production processes for polyurethane shaped articles, because polytetrahydrofurans contain only primary hydroxyl groups and are therefore particularly reactive. The polytetrahydrofuran content of a hardener composition according to the invention is then preferably 10 to 20% by weight. In contrast, those of the compositions according to the invention which comprise polypropylene glycols as constituent b) are particularly suitable for the production of polyurethane shaped articles by manual casting.

Poly(oxyalkylene)polyamines which are suitable for the invention are known and can be obtained, for example, in accordance with the above mentioned U.S. Patent Specification 3,267,050 from polyether-polyols of appropriate functionality and appropriate molecular weight. Particularly suitable types are also commercially obtainable under the name JEFFAMINE ®. Examples here are:

JEFFAMINE ® D 2000, an amino-terminated polypropylene glycol of the general formula $H_2NCH(CH_3)CH_2—[OCH_2CH(CH_3)]_x—NH_2$, in which x has an average value of 33, so that a total molecular weight of about 2000 results;

JEFFAMINE ® ED 2001 of the following formula $H_2NCH(CH_3)CH_2—[OCH_2CH(CH_3)]_a[OCH_2CH_2]_b[OCH_2CH(CH_3)]_c—NH_2$, in which b has an average value of about 40.5 and a+c is about 2.5;

JEFFAMINE ® BUD 2000, a urea-terminated polypropylene ether of the formula

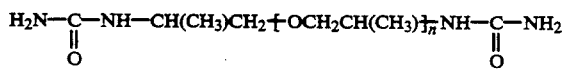

in which n has an average value of about 33, so that a molecular weight of about 2075 results; and finally JEFFAMINE ® T 3000, a poly(oxypropylene)triamine started from glycerol, of the formula

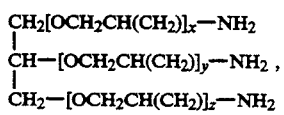

in which x+y+z has an average value of about 50, so that the molecular weight is about 3000.

The poly(oxyalkylene)polyamines are preferably present in an amount of 5 to 25% by weight, based on the total composition according to the invention, since this in general gives particularly good values both for the viscosity of the reaction mixture of the hardener composition and a polyisocyanate of the diphenylmethane series and the reactivity of the reaction mixture and for the mechanical and thermal properties of the cured products obtained therefrom.

In terms of their chemical structure, the poly(oxyalkylene)polyamines are preferably poly(oxypropylene)-polyamines. Furthermore, a value of about 2000 has proved to be particularly appropriate for the molecular weight. Of the abovementioned JEFFAMINE ® examples, JEFFAMINE ® D 2000 is therefore particularly preferred.

A specific embodiment of the hardener compositions according to the invention comprises, as an additional constituent d), another polyether-polyol having on average 2 to 4 hydroxyl groups per molecule and an average molecular weight per hydroxyl group of more than 500. From the point of view of their chemical composition, the statements made above for the polyether-polyols suitable as constituent b) apply accordingly to these polyether-polyols which are suitable as component d), so that the information given there is merely referred to at this point. Polyether-polyols which comprise solid organic fillers in disperse distribution and partly bonded chemically to the polyether, such as polymer-polyols and polyurea-polyols, however, are also suitable as constituent d) of the compositions according to the invention. As is known, the polymer-polyols are polymer dispersions which are prepared by free radical polymerisation of suitable olefinic monomers, in particular acrylonitrile, styrene or mixtures of the two, in a polyether which serves as a grafting base. Polyurea-polyols (PHD-polyethers) are a dispersion of polyureas obtainable by reaction of polyisocyanates with polyamines in the presence of polyether-polyols, partial chemical linking of polyurea material to the polyether-polyols via the hydroxyl groups on the polyether chains likewise taking place. Polyols such as those defined in this section are described in more detail, for example, in Becker/Braun "Kunststoffhandbuch (Plastics Handbook)", Volume 7 (Polyurethane (Polyurethanes)), 2nd Edition, Carl Hanser Verlag, Munich Vienna (1983), pages 76 and 77.

By addition of component d), the reactivity of the reaction mixtures with the polyisocyanates and the initial viscosity thereof can additionally be reduced without properties such as toughness being influenced. Component d) can in general be used in an amount of up to 80% by weight, based on the total amount of components c) and d). Higher contents should be avoided, in order to obtain a polyurethane material of adequate cracking resistance. The hardener compositions according to the invention preferably comprise constituent d) in an amount of 40 to 70% by weight, based on the total amount of components c) and d). Component c), together with component d), preferably makes up about 13 to 45% by weight of the hardener compositions according to the invention.

The average equivalent weight of the total hardener composition according to the invention should in general be between 120 and 220; values of 150 to 200 are preferred. In this calculation, primary amino groups, such as those of JEFFAMINE ®, have been equated with hydroxyl groups.

The compositions can furthermore comprise customary additives suitable for polyurethane technology in customary amounts. These are, for example, catalysts, both basic compounds, such as tertiary amines, for example N-methylethanolamines, such as, in particular, N-methyldiethanolamine, triethanolamine, dibenzylmethylamine, diazabicyclooctane and the like, and acid compounds, for example organotin compounds, such as dibutyltin laurate. Other additives are: foam suppressants, for example polysilicones, surface-active substances, such as castor oil, drying agents, for example molecular sieves based on zeolite, internal mould release agents, fillers, dyes, pigments, in particular titanium dioxide, flameproofing agents or blowing agents, in particular water. Other suitable additives are also listed in Becker/Braun "Kunststoffhandbuch (Plastics Handbook)", Volume 7 (Polyurethane (Polyurethanes)), 2nd Edition, Carl Hanser Verlag, Munich Vienna (1983). The total content of additives in the hardener compositions according to the invention is in general 0 to 30% by weight.

Hardener compositions according to the invention can be used for manual and for mechanical production of polyurethane shaped articles.

For this, a reaction mixture of a polyisocyanate of the diphenylmethane series and at least one of the hardener compositions according to the invention is first prepared, if appropriate with addition of auxiliaries and additives, for example as mentioned in the above section.

The invention therefore also relates to a curable reaction mixture for the production of polyurethane shaped articles, comprising a polyisocyanate of the diphenylmethane series and at least one hardener component which is one of the compositions described above.

"Polyisocyanate of the diphenylmethane series" is understood here as meaning derivatives of diphenylmethane which contain on average at least two free isocyanate groups per molecule. Polyisocyanates which are liquid at ambient temperature or at only slightly elevated temperatures are in general preferred. Examples of suitable polyisocyanates are monomeric diisocyanatodiphenylmethane isomers (MDI), such as 4,4'-diisocyanatodiphenylmethane, 2,4'-diisocyanatodiphenylmethane or 2,2'-diisocyanatodiphenylmethane, or mixtures thereof, for example a mixture of 60% by weight of the 2,4'-isomer and 40% by weight of the 4,4'-isomer. MDI polymer types, i.e. substances of the general formula OCN—[C$_6$H$_4$]—CH$_2$—[[—[C$_6$H$_3$(-NCO)]—CH$_2$—]]$_n$—[C$_6$H$_4$]—NCO in which n in general assumes values of up to 8, are also suitable. If appropriate, the polymer types mentioned can also be employed as a mixture with monomers. The mixture can thus be, for example, a mixture with 30 to 70% by weight of a dinuclear content (n=0), 15 to 40% by weight of a trinuclear content (n=1) and if appropriate 15 to 30% by weight of a content which is more than trinuclear (n>1). Such mixtures and similar mixtures are also commercially obtainable. Urethanised diisocyanatodiphenylmethanes such as are obtained, for example, by preliminary reaction of diisocyanatodiphenylmethane with low molecular weight di- or triols, carbodiimidised or uretdionised diisocyanatodiphenylmethanes or mixtures of the diisocyanatodiphenylmethane derivatives mentioned are also particularly suitable. Diisocyanatodiphenylmethane derivatives having biuret or allophanate groups can also be used.

Particularly good properties are shown by a polyisocyanate composition which comprises 5 to 20% by weight of polyisocyanates obtainable by reaction of diisocyanatodiphenylmethanes via isocyanate groups, such as the corresponding carbodiimides or uretdiones (for example 7 to 12% by weight of uretdione and 0 to 5% by weight of carbodiimide), 2 to 10% by weight of diisocyanatodiphenylmethane polymer types of the general formula $OCN-[C_6H_4]-CH_2-[[-[C_6H_3(-NCO)]-CH_2-]]_n-[C_6H_4]-NCO$, in which n is $\geq 1$, and 70 to 93% by weight of a mixture of monomeric diisocyanatodiphenylmethane isomers, this mixture in turn comprising 45 to 90% by weight of 4,4'-diisocyanatodiphenylmethane and 10 to 55% by weight of 2,4'and 2,2'-diisocyanatodiphenylmethane. An example of a polyisocyanate composition of the composition mentioned is a mixture of about 70% by weight of Desmodur ® CD and 30% by weight of Desmodur ® VL 50. In particular, polyisocyanate compositions such as these have only an extremely slight intrinsic colouration (pale beige) and therefore in particular also allow pale-coloured shaped articles to be produced in a very pure colour. The purest possible 4,4'-diisocyanatodiphenylmethane was hitherto used as the hardener composition for preparation of polyurethane material of correspondingly pure colour with the aid of polyisocyanates of the diphenylmethane series. However, correspondingly pure 4,4'-diisocyanatodiphenylmethane tends to crystallise out at temperatures from 0° C. to room temperature, and therefore, for example, cannot be stored at low temperatures. A polyisocyanate composition of neutral colour as described above, however, remains free-flowing even at lower temperatures in the abovementioned range. The invention therefore also relates to a reaction mixture comprising the polyisocyanate composition mentioned.

The reaction mixtures according to the invention comprise the polyisocyanate in the customary amount, in general corresponding to an isocyanate number (quotient of the number of isocyanate groups and the number of groups which can react with isocyanate groups in the reaction mixture, multiplied by 100) of between 70 and 130, preferably corresponding to an isocyanate number of between 90 and 110. A primary amino group here again corresponds to a hydroxyl group.

Another particularly good embodiment of the reaction mixtures according to the invention comprises N-methyldiethanolamine as the catalyst. Since this compound in fact contains two hydroxyl groups, it participates in the polyurethane composition like a polyol, and therefore cannot escape (exude) from the material during the life of the polyurethane.

The reaction mixtures preferably have relatively low mixing viscosities, for example in the range from 500 to 1500 mPa.s.

The processing times (pot lives) of the reaction mixtures are in general between 15 seconds and 120 minutes, depending on the polyisocyanate and hardener composition used and the isocyanate number of the mixture. A desired processing time can be established particularly favourably and at a constant polyisocyanate component and constant mixing ratio of polyisocyanate to total content of hardener in the reaction mixture by using different amounts of various hardener compositions, each of which allow a different processing time. For this purpose, for example, it is possible to prepare a reaction mixture based on two or more different hardener compositions according to the invention.

The hardener which allows a different processing time can also be, however, a different type of hardener, as long as this likewise allows full curing of polyisocyanates of the diphenylmethane series at room temperature and without additional external heating of the reaction mass, and without a brittle phase occurring during this operation.

Another of these hardener components is described, for example, in U.S. patent application Ser. No. 07/875,880, now U.S. Pat. No. 5,239,036 corresponding to EP-A-0 512 947. These are compositions which comprise e) a polyol having on average 3 to 8, preferably 4 to 8, hydroxyl groups per molecule and an average molecular weight per hydroxyl group of up to 150; f) a polyether-polyol having on average 2 to 3 hydroxyl groups per molecule and an average molecular weight per hydroxyl group of 150 to 500, in particular a corresponding polypropylene glycol or polytetrahydrofuran or a mixture of the two, and g) a polyether-polyol having on average 2 to 4 hydroxyl groups per molecule and an average molecular weight per hydroxyl group of more than 1900, and if appropriate h) a polyether-polyol having on average 2 to 4 hydroxyl groups per molecule, the average molecular weight per hydroxyl group thereof lying between the corresponding weight of constituents f) and g) in the composition. For the chemical build-up of the polyols and polyether-polyols of this hardener type, the statements made above for the polyols and polyether-polyols of the compositions according to the invention apply accordingly, i.e. taking into account the sometimes different equivalent weights and functionalities. Those of the compositions mentioned which comprise a polypropylene glycol as component f)— when employed in the pure form and if the abovementioned isocyanate numbers for the reaction mixture are maintained—in many cases allow processing times of up to 180 minutes and can therefore be employed in combination with the hardeners according to the invention, if this is desirable, in order to prolong the pot lives of the reaction mixtures.

A particularly favourable embodiment is therefore formed by curable reaction mixtures according to the invention which comprise at least two different hardener components, each of which, when used by itself with the polyisocyanate employed in a mixture of the same isocyanate number, allows different processing times, the reaction mixture having a processing time which lies between that which can be achieved with the individual hardener components by themselves and curing fully at room temperature and without additional heating, without a brittle phase occurring during this procedure.

In some cases, it may be advantageous here if the different hardener components are coloured differently, since the maximum possible processing time of the mixture can then in general be determined particularly easily from the resulting mixed colour of the reaction mixture.

Reaction mixtures having a longer processing time are particularly suitable for manual preparation and processing, as is customary, while mixtures of short pot life are advantageously both mixed mechanically and further processed to shaped articles mechanically by the process techniques which are known per se, for example those described in Ullmanns Encyclopädie der technischen Chemie (Ullmann's Encyclopedia of Industrial Chemistry), 4th Edition, Volume 19, Verlag Chemie GmbH, Weinheim 1980, page 316 et seq., such as the reaction injection moulding technique, the vacuum casting technique and others.

If desired, the hardener compositions according to the invention can also be intermediately stored for a prolonged period before preparation of the reaction mixtures without the liquid phase demixing, and after storage can be employed without it first being necessary to form a homogeneous emulsion again from the liquid constituents of the compositions.

The invention therefore also relates to a process for the production of polyurethane shaped articles, in which a component based on polyisocyanates of the diphenylmethane series is mixed with at least one of the hardener compositions according to the invention, which may have been intermediately stored beforehand, and, if appropriate, other additives customary in polyurethane technology to give a curable reaction mixture such as that described, and the resulting mixture is shaped and cured fully to give the shaped article.

Curing is in general carried out here at a temperature of between 15° and 40° C., particularly preferably at room temperature, i.e. at about 15° to 25° C., and without additional heating of the material by heating the mould employed. Homogeneous curing takes place. Although not necessary, the shaped articles which have already been released from their casting mould can also be after-cured at higher temperatures if appropriate.

Finally, the invention furthermore relates to polyurethane shaped articles obtainable from a casting resin which corresponds to one of the reaction mixtures described above.

Polyurethane shaped articles which comprise no free plasticiser are particularly preferred.

The term "free plasticiser" is understood here as meaning conventional plasticiser compounds, i.e. those which contain no functional groups which participate in the reaction of the polyisocyanate with the hardener compositions. Plasticisers of this type, for example adipic acid esters and dibutyl or dioctyl phthalates, which were often added to the hardener compositions for homogenisation and to increase the elasticity of the polyurethane material, have the disadvantage that they slowly exude out of the material, which leads to a constantly increasing embrittlement of the polyurethane material during its life. Because of the specific composition of the hardener composition according to the invention, however, such conventional plasticisers are as a rule unnecessary, so that shaped articles according to the invention hardly change their elasticity properties in the course of their life.

Polyurethane shaped articles of varying size can be produced particularly easily according to the invention. A particular advantage of the present invention here is that the pot lives of the reaction mixtures according to the invention can be controlled particularly easily and can be varied within a wide range. The larger a mould, in particular, the longer in general also the filling time required for it. However, the pot life of the reaction mixture used must of course be at least somewhat longer than the filling time of the mould used. If a polyisocyanate composition and at least two hardener compositions which result in different pot lives with the polyisocyanate are kept in storage, however, reaction mixtures which are adapted to the particular requirements can be prepared quickly and in a simple manner, even mechanically, for example in the manner described above, without changes in the properties of the polyurethane material prepared therefrom having to be accepted because of a changed mixing ratio of isocyanate to total amount of hardener.

EXAMPLES

The constituents described with commercial names in the following examples are characterised in more detail below:

LUPRANOL ® 3321 a mixture of a polypropylene glycol started with sucrose and a polypropylene glycol started with glycerol, having an average molecular weight per hydroxyl group of 140 (CAS No. 56731-02-3), QUADROL ® L tetrakis(2-hydroxypropyl)-ethylenediamine (CAS No. 102-60-3), LUPRANOL ® 2000 polyalkylene glycol started with glycerol, which comprises ethylene oxide units and propylene oxide units and has an average molecular weight per hydroxyl group of 1340 (CAS No. 9082-00-2), LUPRANOL ® 2042 polyalkylene glycol started with trimethylolpropane, which comprises ethylene oxide units and propylene oxide units and has an average molecular weight per hydroxyl group of 2150 (CAS No. 52624-57-4), JAFFAMINE ® D 2000 an amino-terminated polypropylene glycol having a total molecular weight of about 2000 and the general formula $H_2NCH(CH_3)CH_2-[OCH_2CH(CH_3)]_x-NH_2$ (x is on average 33), POLYSORB ® 668 a drying agent based on a zeolite in castor oil.

Examples 1–5

Hardener compositions are prepared by mixing the particular constituents shown in the following Table 1. These can be stored at room temperature for several months without demixing such that several liquid phases form.

A polyisocyanate composition of 75.2% by weight of 4,4'-diisocyanatodiphenylmethane (4,4'-MDI), 10% by weight of 2,4'-MDI, 1.8% by weight of 2,2'-MDI, 3.1% by weight of MDI oligomers, 0.6% by weight of MDI carbodiimide and 9.4% by weight of MDI uretdione furthermore is prepared (for example by mixing 70% by weight of DESMODUR ® CD and 30% by weight of DESMODUR ® VL50). This isocyanate composition has a density of 1.22 g/ml and a viscosity of 30 mPa. s.

It is mixed manually, in a weight ratio of 80 to 100, with the hardener compositions according to Table 1. Because of their relatively long pot lives, the resulting mixtures are particularly suitable for manual casting. Curing of the mixture at room temperature gives a polyurethane material having the properties listed in the bottom part of Table 1. No brittle phase during curing can be detected in any of the reaction mixtures used in Examples 1 to 5.

Examples 6 and 7

Further hardener compositions are prepared by mixing the particular constituents shown in the following Table 2. These can also be stored for months at room temperature without demixing. Crude industrial diisocyanatodiphenylmethane (DESMODUR ® 44V20) is used as the isocyanate component. This is mixed with the particular hardener component in a weight ratio of 80 to 100. Because of their higher reactivity, the resulting mixtures are particularly suitable for mechanical casting. Curing of the mixture at room temperature gives a polyurethane material having the properties listed in the bottom part of Table 2. Again, no brittle phase can be detected during curing in either of the two reaction mixtures.

Examples 8 to 10

Further hardener compositions are prepared by mixing the particular constituents shown in the following Table 3. These can also be stored for months at room temperature without demixing. The particular amounts of hardener and isocyanate components employed are likewise shown in the table. Curing of the mixture at room temperature gives a polyurethane material having the properties listed in the bottom part of Table 3, the high heat deformation resistances being particularly striking, especially the heat deformation resistance of the material obtained using polyethylene glycol (Example 9). Again, no brittle phase can be detected during curing in any of the reaction mixtures.

TABLE 2

| | Example No. 6 | Example No. 7 |
|---|---|---|
| QUADROL ® L [% by weight] | 34.2 | 37.3 |
| Polytetrahydrofuran (molecular weight 650) [% by weight] | 14.99 | 16.2 |
| LUPRANOL ® 2000 [% by weight] | 17.3 | 18.8 |
| N-Methyldiethanolamine (catalyst) [% by weight] | 3.1 | 3.4 |
| Polysorb ® 668 [% by weight] | 7.1 | 7.8 |
| Defoamer [% by weight] | 0.6 | 0.7 |
| JEFFAMINE ® D 2000 [% by weight] | 7.3 | 16 |
| LUPRANOL ® 2042 [% by weight] | 15.3 | 0 |
| Processing time [seconds] | 40 | 30 |
| Shore D hardness after curing of 24 hours/RT[1] | 78 | 79 |
| Shore D hardness after curing of 14 hours/80° C. | 79.5 | 82 |
| Flexural test:[2] (DIN 53457) δ max [MPa] | 75 | 73 |
| ε at fracture [%] | 10 | 6,5 |
| E modulus [MPa] | 1558 | 1604 |
| Bend notch[2,4] GiC [J/m$^2$] | 1624 | 2386 |
| KiC [MPa √m] | 1.84 | 1.85 |
| Heat deformation resistance [°C.] | 110 | 117 |

[1,2,3,4]see under Table 1

TABLE 3

| | Example No. 8 | Example No. 9 | Example No. 10 |
|---|---|---|---|
| QUADROL ® L [p. by weight][6] | 31.7 | 31.7 | 31.7 |
| Polytetrahydrofuran (molecular weight 650) [p. by weight] | 13.8 | — | — |
| Polyethylene glycol (molecular weight 600) [p. by weight] | — | 12.7 | — |
| Polypropylene glycol (molecular weight 400) [p. by weight] | — | — | 9.0 |
| Polysorb ® 668 [p. by weight] | 6.66 | 6.6 | 6.6 |
| Defoamer [p. by weight] | 0.6 | 0.6 | 0.6 |
| JEFFAMINE ® D 2000 [p. by weight] | 13.5 | 13.5 | 13.5 |
| LUPRANOL ® 2042 [p. by weight] | 16 | 16 | 16 |
| Amount employed | | | |

TABLE 1

| | Example No. 1 | Example No. 2 | Example No. 3 | Example No. 4 | Example No. 5 |
|---|---|---|---|---|---|
| LUPRANOL ® 3321 [% by weight] | 63.7 | 62.4 | 60 | 57.6 | 55.1 |
| Polypropylene glycol (molecular weight 400) [% by weight] | 14 | 13.7 | 13.3 | 12.7 | 12.1 |
| LUPRANOL ® 2000 [% by weight] | 8.6 | 8.4 | 8.1 | 7.8 | 7.4 |
| N-Methyldiethanolamine (catalyst) [% by weight] | 0.25 | 0.25 | 0.25 | 0.25 | 0.22 |
| Polysorb ® 668 [% by weight] | 8.2 | 8 | 7.8 | 7.4 | 7.2 |
| Defoamer [% by weight] | 0.1 | 0.1 | 0.1 | 0.1 | 0.1 |
| JEFFAMINE ® D 2000 [% by weight] | 5.1 | 7 | 9.7 | 13.9 | 17.7 |
| Gelling time[5] [minutes] | 36 | 35 | 31 | 26 | 24 |
| Shore D hardness after curing of 24 hours/RT[1] | 78 | 76.5 | 75.5 | 73.5 | 71 |
| Shore D hardness after curing of 14 hours/80° C. | 84.5 | 84.5 | 84 | 82.5 | 81 |
| Flexural test:[2] (DIN 53457) δ max [MPa] | 118 | 115 | 110 | 99 | 87 |
| ε at fracture [%] | 10 | 11 | nf[3] | nf | nf |
| E modulus [MPa] | 2776 | 2712 | 2625 | 2390 | 2111 |
| Bend notch[2,4] GiC [J/m$^2$] | 655 | 684 | 709 | 2028 | 2480 |
| KiC [MPa √m] | 1.47 | 1.49 | 1.49 | 2.40 | 3.38 |
| Heat deformation resistance [°C.] | 75 | 74 | 73 | 72 | 69 |
| Viscosity of the reaction mixture after 1 minute [mPa · s] | 490 | 530 | 650 | 870 | 1240 |

[1]Room temperature
[2]after curing of 14 hours/80° C.
[3]no fracture
[4]Three-point flexural test according to Klaus Heckel "Einführung in die technische Anwendung der Bruchmechanik (Introduction to the Technical Application of Fracture Mechanics)", Carl Hanser Verlag, Munich Vienna 1991, page 66; specimen size: 60 × 12.5 × 4 mm, distance between load points: 50 mm, notch depth: 4–5 mm (CIBA-GEIGY test method No. 258-0/90)
[5]determined with a TECAM ® apparatus [Techne Ltd., Cambridge], British Standard BS 3532

TABLE 3-continued

| | | Example No. | | |
|---|---|---|---|---|
| | | 8 | 9 | 10 |
| Hardener component [g] | | 82.2 | 81.1 | 77.4 |
| Isocyanate component[7] [g] | | 73 | 72.9 | 72.9 |
| Processing time [seconds] | | 40 | 30 | 30–35 |
| Flexural test:[2] | δ max [MPa] | 62 | 60 | 68 |
| (DIN 53457) | ε at fracture [%] | 8 | 6.5 | 7 |
| | E modulus [MPa] | 1384 | 1376 | 1075 |
| Bend notch[2,4] | GiC [J/m$^2$] | 1090 | 1234 | 1075 |
| | KiC [MPa √m] | 1.34 | 1.42 | 1.4 |
| Heat deformation resistance [°C.] | | 125 | 150 | 137 |

[2,3,4]see under Table 1
[6]parts by weight
[7]DESMODUR ® 44 V20

What is claimed is:

1. A composition comprising
   a) a polyol having on average 3 to 8 hydroxyl groups per molecule and an average molecular weight per hydroxyl group of up to 150;
   b) a polyether-polyol having on average 2 to 3 hydroxyl groups per molecule and an average molecular weight per hydroxyl group of 150 to 500 and
   c) a poly(oxyalkylene)polyamine having on average 2 to 4 amino groups per molecule and an average total molecular weight of between 1000 and 3000.

2. A composition according to claim 1, which comprises a polytetrahydrofuran as constituent b).

3. A composition according to claim 1, which comprises a polypropylene glycol as constituent b).

4. A composition according to claim 1, which comprises a polyethylene glycol as constituent b).

5. A composition according to claim 1, which comprises a polyether-polyol having on average 2 to 4 hydroxyl groups per molecule and an average molecular weight per hydroxyl group of more than 500 as a further constituent d) in an amount of up to 80% by weight, based on the total amount of components c) and d).

6. A curable reaction mixture for the production of polyurethane shaped articles, comprising a polyisocyanate of the diphenylmethane series and at least one hardener component which is a composition according to claim 1.

7. A reaction mixture according to claim 6, which comprises n-methyldiethanolamine as a catalyst.

8. A reaction mixture according to claim 6, which comprises at least two different hardener components, each of which, when used by itself with the polyisocyanate employed in a mixture of the same isocyanate number, allows different maximum processing times, the reaction mixture having a processing time which lies between those which can be achieved with the individual hardener components by themselves and curing fully at room temperature and without additional heating, without a brittle phase occurring during this operation.

9. A reaction mixture according to claim 8, in which the different hardener components are differently coloured.

10. A process for the production of polyurethane shaped articles in which a component based on polyisocyanates of the diphenylmethane series is mixed with at least one composition according to claim 1, which composition may have been intermediately stored beforehand, to give a curable reaction mixture comprising a polyisocyanate of the diphenylmethane series and at least one hardener component which is a composition according to claim 1, and the resulting mixture is shaped and cured fully to give the shaped article.

11. A process according to claim 10, in which the curing is carried out at room temperature and without additional heating of the mould employed.

12. A polyurethane shaped article obtainable from a reaction mixture according to claim 6.

13. A polyurethane shaped article according to claim 12, which comprises no free plasticiser.

14. A reaction mixture according to claim 6, which comprises a polyisocyanate component which comprises 5 to 20% by weight of polyisocyanates obtainable by intracondensation of diisocyanatodiphenylmethane, 2 to 10% by weight of diisocyanatodiphenylmethane polymer types of the formula OCN—[C$_6$H$_4$]—CH$_2$—[-[—C$_6$H$_3$(NCO)]—CH$_2$—]]$_n$—[C$_6$H$_4$]—NCO, in which n is ≧1, and 70 to 93% by weight of a mixture of monomeric diisocyanatodiphenylmethane isomers, this mixture in turn comprising 45 to 90% by weight of 4,4'-diisocyanatodiphenylmethane and 10 to 55% by weight of 2,4'- and 2,2'-diisocyanatodiphenylmethane.

15. A process according to claim 10, in which the component based on polyisocyanates of the diphenylmethane series is also mixed With other additives customary in polyurethane technology selected from the group consisting of catalysts, foam suppressants, surface-active substances, drying agents, internal mould release agents, fillers, dyes, pigments, flameproofing agents and blowing agents.

* * * * *